Patented Sept. 15, 1931

1,822,972

UNITED STATES PATENT OFFICE

GEORG KALISCHER AND OTTO BAYER, OF FRANKFORT-ON-THE-MAIN, GERMANY, ASSIGNORS TO GENERAL ANILINE WORKS, INC., OF NEW YORK, N. Y., A CORPORATION OF DELAWARE

VAT DYESTUFFS OF THE ANTHRAQUINONE OXAZOLE SERIES

No Drawing. Application filed May 27, 1930, Serial No. 456,278, and in Germany June 1, 1929.

In British Letters Patent No. 198,077 the manufacture of vat dyestuffs is described consisting in condensing anthra-quinone-2-aldehyde or a substitution product thereof with an o-aminophenol or an o-aminothiophenol. The intensity of the vat dyestuffs thus produced is particularly increased by the presence of the amino-group in 1-position of the anthraquinone nucleous. In the examples of said specification dyestuffs formed by condensing anthraquinone compounds of the aforesaid kind with ortho-aminophenols, o-aminothiophenols and o-o'-diamino-dithiophenols are described.

The present invention relates to certain new embodiments of the above mentioned series of dyestuffs corresponding probably to the general formula:

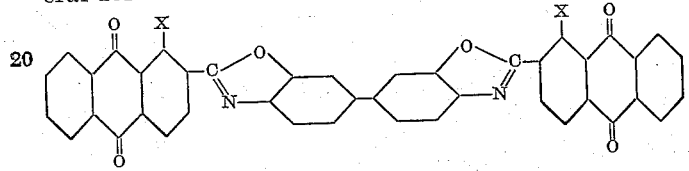

wherein X means hydrogen or the amino-group and the anthraquinone nuclei may be substituted by halogen.

Although, as is well known, oxazoles have less chromophoric properties than thiazoles, the present new dioxazoles represent particularly valuable dyestuffs of a good tinctorial power and good fastness properties.

The new dyestuffs are obtained by condensing one molecular proportion of 3.3'-dihydroxy-benzidine with two molecular proportions of anthraquinone-2-aldehyde or 1-amino-anthraquinone-2-aldehyde or halogen-substitution products thereof or similarly acting compounds, such as ω-dichloro- and ω-trichloro-2-methylanthraquinone or anthraquinone-2-carboxylic acid chloride and 1-amino-anthraquinone-2-anile.

The condensation may be effected by heating a mixture of the components to elevated temperatures, advantageously in the presence of a suitable diluent with or without the addition of salts acting as condensing agents or by treatment with acid condensing agents such as sulfuric acid or zinc chloride.

When anthraquinone-2-aldehyde or 1-amino-anthraquinone-2-aldehyde are used as starting materials the formation of azomethines can be detected, which intermediates are converted into the stable dyestuffs by further heating of the reaction mass.

In order to further illustrate our invention the following examples are given, the parts being by weight and all temperatures in centigrade degrees, but it is however to be understood, that our invention is not limited to the particular products nor reacting conditions mentioned therein.

Example 1

23.6 parts of anthraquinone-2-aldehyde are heated with 10.8 parts of 3.3'-dihydroxy-benzidine in an apparatus provided with a reflux condenser, advantageously with addition of 10 parts of potassium carbonate and about 200 parts of nitrobenzene. When the dyestuff formation has been finished the separated dyestuff is isolated by filtration. Preferably it is dissolved in concentrated sulfuric acid, precipitated again with water and the finely divided aqueous paste thus obtained may be treated for purification with an oxidizing agent such as sodium hypochlorite.

The new dyestuff corresponding probably to the formula:

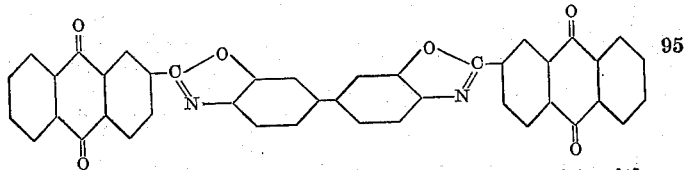

is soluble in concentrated sulfuric acid with an orange brown color and dyes cotton from a brownish olive vat full yellowish orange shades of a good fastness.

Example 2

10 parts of the azomethine, obtained by heating two molecular proportions of anthraquinone-2-aldehyde with one molecular proportion of 3.3′-dihydroxy-benzidine in glacial acetic acid, are mixed with about 60 parts of nitrobenzene and 5 parts of molten sodium acetate and the mixture is heated until no unchanged azomethine can be detected. The separated dyestuff, which is isolated as described in Example 1, corresponds with that of Example 1 in its properties and tinctorial behaviour.

Example 3

27 parts of anthraquinone-2-carboxylic acid chloride are condensed with 10.8 parts of 3.3′-dihydroxy-benzidine and the carboxyamide thus formed is boiled with addition of about 200 parts of nitrobenzene and 10 parts of potassium carbonate in an apparatus provided with a reflux condenser, until the formation of the dyestuff has been finished. The isolated dyestuff corresponds in its behaviour and in its tinctorial properties with that of Example 1.

Example 4

25 parts of 1-amino-anthraquinone-2-aldehyde are dissolved in about 300 parts of nitrobenzene and at 160° 10.8 parts of 3.3′-dihydroxy-benzidine are added. Then the reaction water is distilled off and 20 parts of potassium carbonate are added. The mass is heated for about 7 to 8 hours in an apparatus provided with a stirrer and a reflux condenser and the separated dyestuff is isolated and washed out in the usual manner. It dyes from a claret red vat cotton full bluish red shades of an excellent fastness to light, chlorine and boiling alkali.

Instead of 1-amino-anthraquinone-2-aldehyde one may use its functional derivatives such as the -2-anile as starting material.

A very similar dyestuff is obtained when condensing the 4-bromo-1-amino-anthraquinone-2-aldehyde with 3.3′-dihydroxybenzidine.

The dyestuff prepared by condensing 1-amino-anthraquinone-2-aldehyde with 3.3′-dihydroxy-benzidine corresponds probably to the following formula:

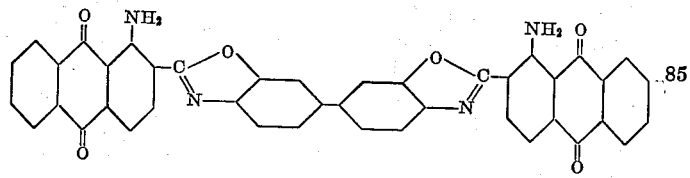

We claim:—

1. As new compounds vat dyestuffs of the anthraquinone series corresponding probably to the general formula:

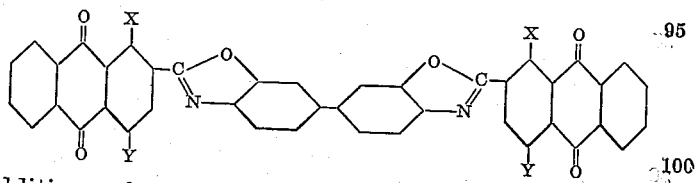

wherein X means hydrogen or the aminogroup and Y hydrogen or halogen, which dyestuffs dye the vegetable fiber full orange to bluish red shades of a good fastness.

2. As new compounds vat dyestuffs of the anthraquinone series corresponding probably to the general formula:

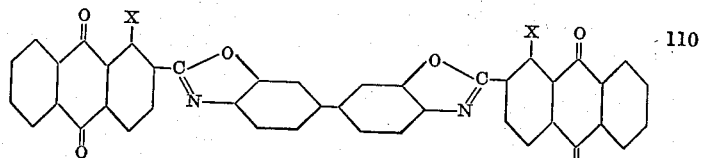

wherein X means hydrogen or the aminogroup, which dyestuffs dye the vegetable fiber full orange to bluish red shades of a good fastness.

3. As a new compound the vat dyestuff of the probable formula:

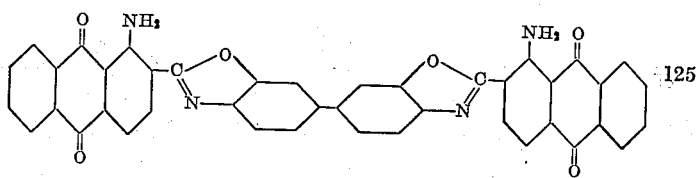

which dyestuff dyes the vegetable fiber full bluish red shades of an excellent fastness to light, chlorine and boiling alkali.

In testimony whereof, we affix our signatures.

GEORG KALISCHER.
OTTO BAYER.